2/8/83 XR 4,373,134

United States Patent [19]
Grace et al.
[11] 4,373,134
[45] Feb. 8, 1983

[54] MAGNETIC CARD VOTE CASTING SYSTEM

[76] Inventors: Phillip F. Grace, 8701 Belleville Rd., Van Buren, Mich. 48111; Howard A. Estes, Jr., 2523 Meade Ct., Ann Arbor, Mich. 48105

[21] Appl. No.: 260,893

[22] Filed: May 6, 1981

[51] Int. Cl.³ ........................ G06K 3/00; G07C 13/00
[52] U.S. Cl. .................................... 235/386; 235/375; 235/380
[58] Field of Search ............... 235/386, 53, 54 F, 375, 235/380

[56] References Cited

U.S. PATENT DOCUMENTS 3,722,793 3/1973 Aronoff ............................ 235/54 F

*Primary Examiner*—Harold I. Pitts
*Attorney, Agent, or Firm*—Charles W. Chandler

[57] ABSTRACT

A voting system employing a plastic registration card having a magnetically recordable section thereon. The voter inserts the card in a recording station which may be at any local convenient location, such as a bank, a post office or the like for recording his election selections on the card. He then presents the card on election day to a precinct voting center where a vote-casting machine reads the information on the card, first to verify the identification of the voter, and secondly, if the identification is acceptable, to tabulate the results. The vote casting machine provides a hard copy output for use at the precinct. It is connected through the telephone lines to a central tabulating unit which compiles voting results from several precincts.

4 Claims, 2 Drawing Figures

MAGNETIC CARD VOTE CASTING SYSTEM

BACKGROUND OF THE INVENTION

This invention is related to electronic voting systems, and more particularly to such a system in which the voter records his vote on his registration card at a recording station prior to the election, the card then being inserted in a vote-casting machine on election day which compiles the vote.

One of the problems with conventional election procedures is their inability to process a larger vote turn out, and a large number of candidates and issues on the ballot on election day. One approach to resolving this problem has been to substitute punch card systems and the like for the conventional lever-operated voting machine. Punch card systems also have their problems because they also sometimes develop waiting lines of voters and in some cases are unreliable.

SUMMARY OF THE INVENTION

The broad purpose of the present invention is to provide a voting system in which the user employs a plastic registration card, similar to a conventional credit card. A magnetic strip is contained on the registration card upon which the voter records his selections in a recording machine. The magnetic strip is then read and its contents stored in a vote-casting machine at the precinct. The recording machines are programmed in advance of the election and located at a variety of convenient locations, such as post offices, banks, and the like so that the user can record his vote in advance of election day. The voter can also be issued his card and vote on election day, if law requires such.

On election day, the voter then goes to the polling precinct where a vote-casting machine reads the card to determine whether or not the voter information on the card compares with voter identification information in a computer memory to prevent re-voting. If the card is validated, the machine then reads the vote selections and stores them in memory, prints a hard copy for recount and audit trail purposes, and at appropriate intervals, transfers the information to a centralized computer for compiling the voter returns from several precincts. A primary advantage of such an arrangement is that it significantly reduces the time for the voter to cast his ballot on election day, since the voter identification process, as well as the balloting can take place in a matter of seconds.

The system is useful and can be readily adapted for handicapped voters, multi-lingual voters, absentee ballots, write-in balloting, over-vote protection, and straight-party voting.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
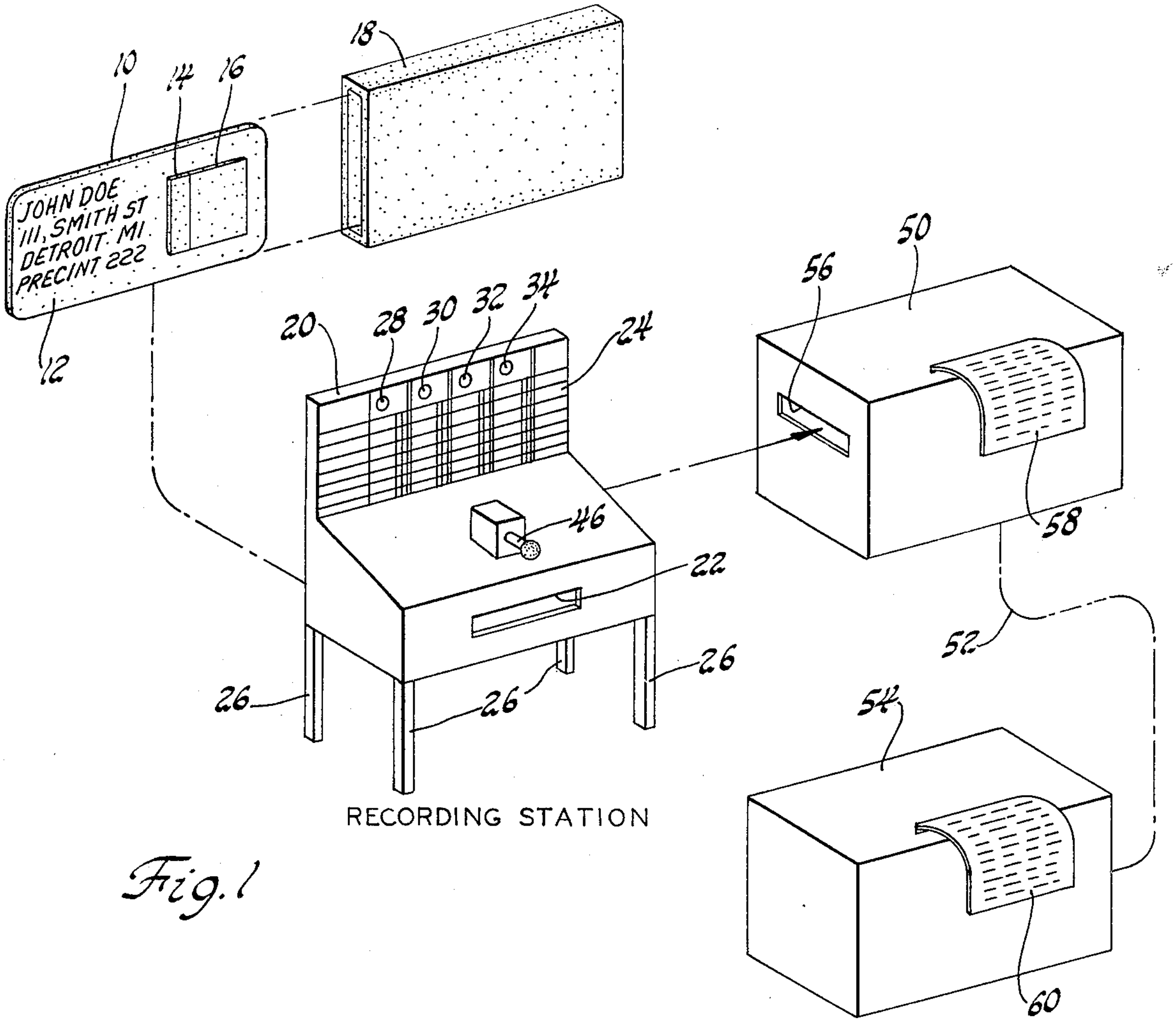
FIG. 1 is a schematic view illustrating the manner in which a registration card is employed in the preferred system.

Referring to the drawing, FIG. 1 illustrates a preferred vote-casting system comprising a voter registration card 10 preferably about the size of a conventional plastic credit card. Identification information 12 is provided on the card to identify the particular voter.

Magnetic means 14 and 16 are provided on card 10. Magnetic means 14 provides means for recording the voter's identification means so that it can be read by an electronic data processing machine. Magnetic means 16 is adapted to record the user's election selections in a manner to be described.

A case 18 provides means for the user to carry his card without disturbing the information on the magnetic means.

A vote-recording machine 20 has an opening 22 for receiving card 10. Machine 20 is located at any convenient recording station, such as a bank, post office, drug store, super market, department store or other official location. Each location maintains one or more voter-recording machines programmed for the particular precinct in which it is located.

Figure 2:
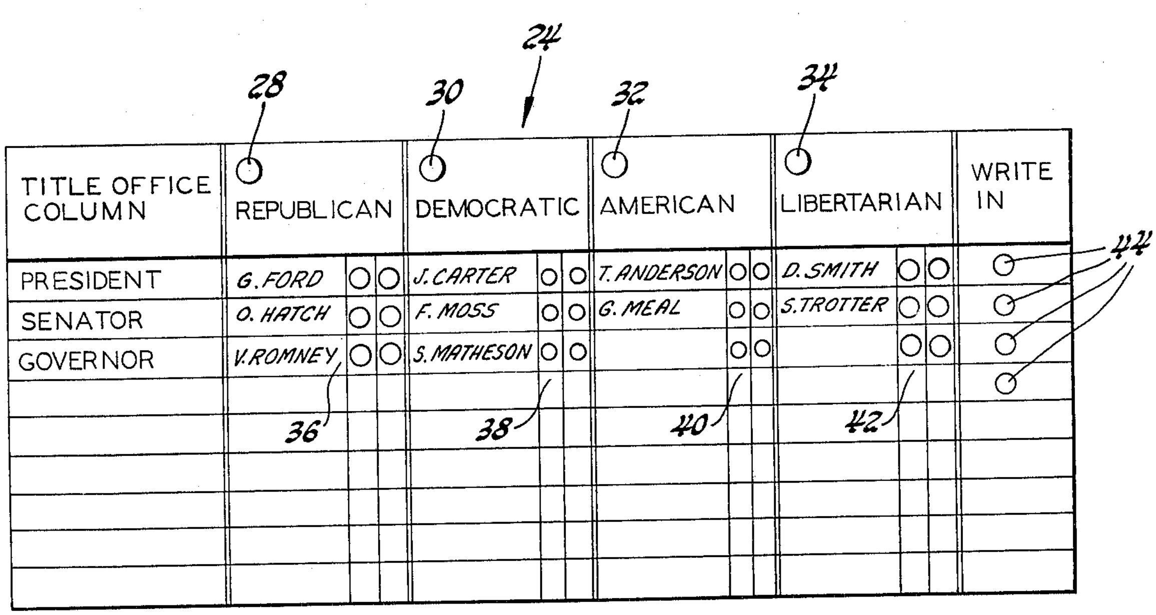
FIG. 2 is an enlarged fragmentary view of the recording machine.

Referring to FIGS. 1 and 2, machine 20 has internal means, well known to those skilled in the art, for recording the voter's ballot selections on the magnetic means 16 in accordance with the ballot illustrated at 24. Machine 20 has legs 26 which can be removed for machine storage. The legs may also be made adjustable for seated voters or to accommodate handicapped voters.

As can be seen from FIG. 2, the ballot provides a matrix format with political parties comprising the columns and the offices to be elected are in rows. Multi-lingual ballots may also be used. Several columns can be accommodated on a ballot, including one for write-in candidates.

To vote, the user inserts his registration card in opening 22 and proceeds to vote by pressing button means 28, 30, 32 or 34 if he intends to vote a straight ballot, or selected individual button means 36, 38, 40 or 42 for selected candidates or issues. Each button is appropriately programmed to make an appropriate indication on the magnetic means 16. If the voter elects to change any of his selections before finalizing his ballot, he simply presses the new selection. Preferably each button is lighted so that he can determine which selections have been made and which have not been made. The means for magnetically recording information on a card are well known to those skilled in the art and need not be described further.

The voter is not required to vote for every office or proposition nor is he restricted from voting a write-in candidate. To vote a write-in candidate, he pushes button 44, and would then be issued a write-in ballot for any office on the official ballot.

When the voter is satisfied that he has completed his ballot, he finalizes his selection by pulling finalize lever 46. His vote is now electro-magnetically recorded on his registration card insuring secrecy. He then removes the card from the machine. If he should change his mind prior to election day, he may complete the entire procedure again. Only the latest votes on the magnetic strip are read by the vote-casting machine.

Vote-casting machine 50 is located at the precinct for use on election day. It is a magnetic registration card reading machine connected by telephone line means 52 to a central tabulation machine 54 located at the main election office. The voter presents card 10 to the precinct officials who verify his registration by inserting the card into slot 56 in machine 50. The vote-casting machine then compares the identification information on strip 14 to the registration information stored in the machine to determine whether or not the voter is registered, and whether or not he has previously voted in the pending election. If the card is accepted, the machine reads and then erases the voter's selections stored on magnetic strip 16 after its contents are stored in a codified manner in the machine. Machine 50 also prints a codified hard copy 58 for precinct audit trail purposes and then returns the registration card to the voter. The entire process takes only a few seconds to complete.

Voters who submit an absentee ballot have their selections recorded on their registration card before election day, as do other voters. However, the absentee voters present their cards to the election officials before election day. The election officials process these cards on election day and then return the cards to their owners at a later date.

At intervals selected by election officials, the stored contents of the vote-casting machine are transmitted to central tabulating machine 54 which also is capable of receiving information from several other machines and precincts, the number of machines being selected to prevent long waiting lines of voters, and also to provide a back-up machine should a vote-casting machine become faulty.

Preferably machines 20, 50, and 54 are formed of solid-state electronic means so that they are reliable and require a minimum of maintenance.

Central tabulating machine 54 is adapted to quickly and easily complete the information from the entire election district and to provide a hard copy output 60 indicating the election results.

Having described our invention, we claim:

1. Voting apparatus, comprising:

a portable voter's registration card having magnetic means thereon and magnetically encoded voter identification on said magnetic means;

a recording machine having means for selectively magnetically recording a voter's selections on said magnetic means;

a vote-casting machine having a memory including means for receiving and supporting the card in a reading position and means for reading the vote selections into said memory;

said vote-casting apparatus having memory means having stored therein a vote identification record for comparing information on the card and for rejecting the card if the identification record does not match with the identification information; and means for producing a hard copy output compilation of the selections read by the vote-casting apparatus.

2. A combination as defined in claim 1, including a central unit for compiling records of a plurality of vote-casting apparatus, and for producing hard copy output of such compilations.

3. A combination as defined in claim 2, including means for transferring the information from the vote-casting machine over a telephone line to the central tabulating unit.

4. A combination as defined in claim 1, including means for erasing the information on the magnetic means on the registration card.

* * * * *